Sept. 7, 1943.  F. D. KNOBLOCK  2,329,058
DIFFERENTIAL MECHANISM
Filed June 2, 1942   2 Sheets-Sheet 1

FIG. 1.

Inventor
Frederick D. Knoblock.
By Cameron, Kerkam & Sutton
Attorneys

Sept. 7, 1943.  F. D. KNOBLOCK  2,329,058
DIFFERENTIAL MECHANISM
Filed June 2, 1942  2 Sheets-Sheet 2
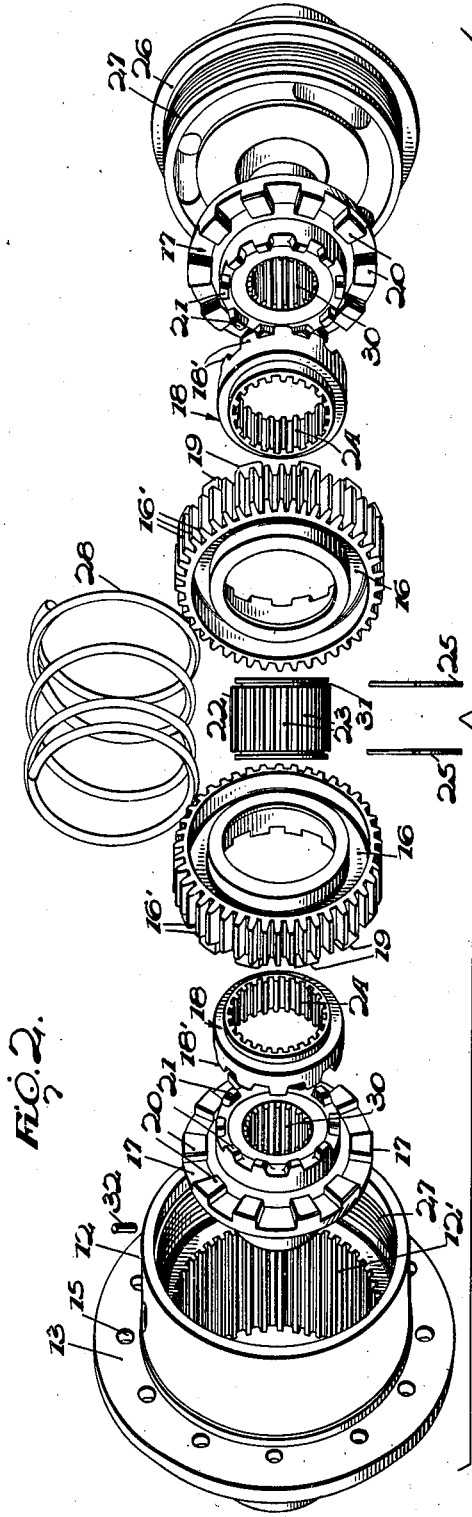
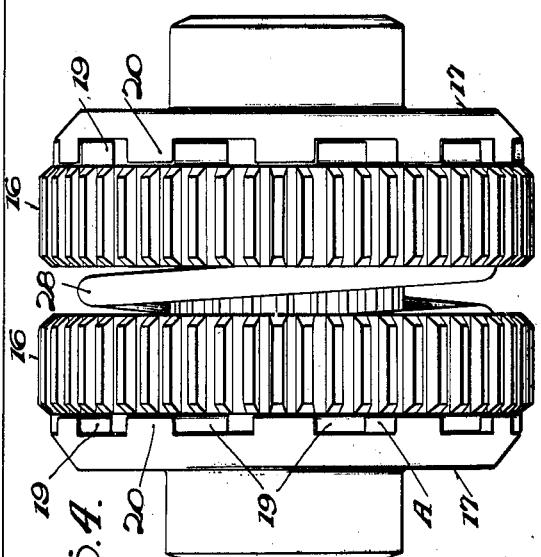
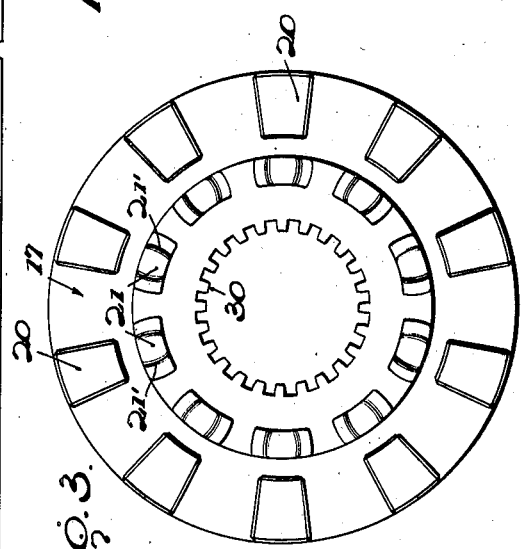
Inventor
Frederick D. Knoblock.
By Cameron, Kerkam & Sutton
Attorneys Patented Sept. 7, 1943

2,329,058

UNITED STATES PATENT OFFICE 2,329,058

DIFFERENTIAL MECHANISM

Frederick D. Knoblock, Birmingham, Mich., assignor, by mesne assignments, to Patent Developers, Inc., Detroit, Mich., a corporation of Michigan Application June 2, 1942, Serial No. 445,517

4 Claims. (Cl. 74—389.5)

The present invention is an improvement in axle differentials or compensators for two opposed shafts which becomes operative for differentiation when there is relative speed between the two shafts.

One of the objects of the present invention is to simplify the construction and reduce the number of parts by providing a splined connection directly between the inside of the differential housing and the driving clutch members.

A second object is to facilitate assembly and disassembly by the provision of a unitary subassembly including two driving clutch members, a spring therebetween, two clutch disengaging cam members, a spool on which said disengaging members are splined and along which they are independently slidable, and two snap rings that maintain these elements in place on said spool.

A third object is the protection of the driving clutch members and other parts during operation by locating the spool between the two driven clutch members and positioning the spool for immediate engagement by one of the two driven clutch members should the latter be axially displaced by one of the two shafts and thus insuring the transmission of any axial thrust to the casing.

Another object is the more efficient operation of the device by shaping the cam teeth on the driven clutch members and on the clutch disengaging members so that the mating pitch diameters are inboard of the outer edges of the cam teeth, thus eliminating chipping of these edges of the teeth and reducing friction when the clutches are engaging or disengaging.

The invention will be better understood by reference to the accompanying drawings, wherein Fig. 1 is a sectional view of the axle differential, the ring gear and part of the differential housing;

Fig. 2 is an exploded view showing the operative parts in perspective;

Fig. 3 is a face view of one of the driven clutch members; and

Fig. 4 is an elevation of the driving and driven members, the spool and the spring.

Referring to the drawings which illustrate one embodiment of the inventive idea and wherein like reference numerals indicate like parts, 10 and 11 indicate the ends of two opposed shafts on which is mounted a differential casing or housing 12 which is rotated in any suitable manner as by the provision of an integrally formed flange 13 to which a ring gear 14 may be affixed as by bolts 15. Within this housing is carried a pair of driving clutch members 16, 16, a pair of driven clutch members 17, 17 and a pair of clutch disengaging cam members 18, 18. The driving clutch members have splines 16' on their periphery that engage corresponding splines 12' on the interior of the differential housing and along which splines 12' the driving clutch members 16 are longitudinally slidable. The driving clutch members are provided with driving clutch teeth 19 that engage driven clutch teeth 20 on the driven clutch members 17. The clutch disengaging cam members 18 are provided with cam teeth 18' which engage corresponding cam teeth 21 on driven clutch members 17. The clutch disengaging cam members 18 are mounted on and carried by a spool 22 provided with longitudinal splines 23 engaging splines 24 on said clutch disengaging cam members 18 whereby the spool 22 drivingly connects the clutch disengaging cam members 18 which are independently slidable inwardly along the splines on said spool 22. The cam disengaging members 18 are held in position on the spool 22 by a pair of snap rings 25. The differential housing 12 is closed by a cap 26 which has a screw-threaded engagement 27 with the housing or is otherwise secured in place.

As shown in Fig. 1, the left-hand driven clutch member 17 engages the interior of the housing which thus prevents axial movement thereof to the left, and the right-hand driven clutch member engages the interior of the cap 26 that prevents axial movement thereof to the right. The driving clutch members are held apart by a coiled spring 28 against the tension of which the driving clutch members 16 are movable inwardly to disengage the clutch when there is relative speed of rotation between the shafts 10 and 11, the disengagement of the clutch being effected by the operation of the cam teeth 21 carried by the driven clutch members 17 on the cam teeth 18' of the clutch disengaging cam member 18, this action being made effective by the lost motion between the clutch teeth 19 and 20 as indicated at A in Fig. 4.

It is pointed out that the opening in the spool 22 is large enough to accommodate the shafts 10 and 11, the ends of which shafts are splined at 29 to engage splines 30 on the driven clutch members. The spool 22 is positioned between the driven clutch members 17 and the clearance between the spool 22 and the two driven clutch members 17 is so small that the thrust resulting from any displacement inwardly of either driven clutch member 17 by the improper engagement of the splines 29 with the splines 30 will be immediately transferred through the spool and the other driven clutch member to the differential housing 12 whereby sufficient space will be preserved between the driving clutch members 16 so that, if necessary, they may both be declutched at the same time, as would be necessary if there was a reversal of torque in going over a bump or on a turn. This also insures full spline engagement of the shafts with the driven members 17.

Assembly and disassembly are further facilitated by the provision of a unitary subassembly including the two driving clutch members 16, the spring 28, the clutch disengaging members 18, the spool 22 and the two snap rings 25. In forming this subassembly the left-hand snap ring 25 is first placed on the spool 22 after which the left-hand clutch disengaging cam member 18 is slid over the spool with its cam teeth 18' toward the snap ring 25. The left-hand driving clutch member 16 is then slid over the clutch disengaging cam member 18 so that the clutch teeth 19 are on the same side as the cam teeth. The spring 28 is then placed in position in the driving clutch member 16 after which the right-hand driving clutch member 16 is engaged with the spring and the right-hand clutch disengaging cam member 18 is assembled over the splines on the spool 22 so that its cam teeth 18' are properly indexed with respect to the other clutch disengaging member 18. The assembly is pushed together, compressing the spring 28, and the elements are held in place by means of the right-hand snap ring 25 engaging the groove 31 at the right-hand margin of the spool. The distance between the snap rings 25 in the grooves 31 is such that both of the clutch disengaging members 18 cannot engage the snap rings at the same time and therefore the snap rings are relieved of all end thrust during operation. This subassembly can be readily introduced and removed from the differential housing.

When the differential is to be assembled and the parts positioned, as shown for example in Fig. 1, the left-hand driven clutch member 17 is first inserted in the housing. The subassembly just described is next introduced with the splines 16' on the driving clutch members 16 engaging the splines 12' on the interior of the housing 12. Care should be taken that the splines 16' on the two driving clutch members 16 are in axial alignment and so engaged with splines 12'. The right-hand driven clutch member 17 is then inserted in the differential housing, the differential housing cap 26 is screwed into the housing, and a dowel pin 32 is then inserted. Lastly the axle shafts 10 and 11 are inserted.

It will be noted (Fig. 3) that the cam teeth 21 on the driven clutch members 17 are curved radially as indicated at 21'; and the cam teeth 18' on the clutch disengaging cam members 18 are similarly curved radially so that the mating pitch diameters of the cam teeth are near the center of the teeth in a radial direction, thus eliminating chipping of the edges of the teeth and materially reducing the friction when the clutches are engaging or disengaging.

The construction of the differential is simplified, the number of parts are reduced by eliminating the customary driving spider and provided the splined connection between the interior of the housing or casing 12 and the driving clutch members 16, assembly and disassembly of the differential are facilitated, and the driving members are maintained in such spaced relation that, if necessary, both may be simultaneously declutched.

It will be understood that while one embodiment of the inventive idea has been illustrated and described in detail, such idea is susceptible of other mechanical embodiments within the scope of the appended claims.

What is claimed is:

1. In an axle differential for two opposed shafts, a housing, a pair of driving clutch members, a spring between the same, a pair of driven clutch members, a pair of clutch disengaging members positioned between said driving and driven clutch members, a spool on which said clutch disengaging members are mounted and drivingly connected and along which they are independently slidable, and means for retaining said spool, driving clutch members, spring and clutch disengaging members as a unitary subassembly.

2. In an axle differential for two opposed shafts, a casing, a pair of driving clutch members, a spring between the same, a pair of driven clutch members, a pair of clutch disengaging members positioned between said driving and driven clutch members, a spool on which said clutch disengaging members are mounted and drivingly connected and along which they are slidable, and a pair of snap rings for retaining said spool, driving clutch members, spring and clutch disengaging members as a unitary subassembly.

3. In an axle differential for two opposed shafts, a casing, a pair of driving clutch members, a pair of driven clutch members engaging said casing and being immovable axially outward, a pair of clutch disengaging members, a spool on which said clutch disengaging members are mounted and to which they are drivingly connected, said spool being positioned between and immediately adjacent said driven clutch members whereby axial thrust on their driven clutch member is transmitted to the casing through said spool and the other driven clutch member.

4. In an axle differential for two opposed shafts, a pair of driving clutch members, a pair of driven clutch members each having clutch teeth and clutch disengaging cam teeth, and a pair of clutch disengaging members provided with cam teeth that engage the cam teeth on the driven clutch members, said cam teeth on the driven clutch members and on the clutch disengaging members being curved in a radial direction so that the line of tooth contact is nearer the center of the cam teeth whereby chipping at the edges of the teeth is prevented and friction between the cam teeth is reduced during clutch engagement and disengagement.

FREDERICK D. KNOBLOCK.